US010455384B2

United States Patent
Steed et al.

(10) Patent No.: US 10,455,384 B2
(45) Date of Patent: Oct. 22, 2019

(54) VEHICLE SYSTEM AND METHOD FOR INDICATING AVAILABLE COMMUNICATION CHANNELS

(71) Applicant: The Boeing Company, Chicago, IL (US)

(72) Inventors: Robert L. Steed, Bellevue, WA (US); Larry L. Lewis, Seattle, WA (US); Elizabeth A. Riddington, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/327,638

(22) Filed: Jul. 10, 2014

(65) Prior Publication Data

US 2016/0302045 A1 Oct. 13, 2016

(51) Int. Cl.
| | | |
|---|---|---|
| H04B 1/38 | (2015.01) | |
| H04W 4/48 | (2018.01) | |
| H04B 7/185 | (2006.01) | |
| H04M 1/725 | (2006.01) | |
| H04W 4/04 | (2009.01) | |
| H04W 84/04 | (2009.01) | |
| H04W 84/12 | (2009.01) | |
| H04W 88/06 | (2009.01) | |

(52) U.S. Cl.
CPC .......... *H04W 4/48* (2018.02); *H04B 7/18506* (2013.01); *H04B 7/18508* (2013.01); *H04M 1/72583* (2013.01); *H04W 4/046* (2013.01); *H04W 84/042* (2013.01); *H04W 84/12* (2013.01); *H04W 88/06* (2013.01)

(58) Field of Classification Search
CPC .............................. H04W 12/02; H04W 84/06
USPC ........................................................ 455/566
See application file for complete search history.

(56) References Cited

U.S. PATENT DOCUMENTS

| | | | |
|---|---|---|---|
| 7,698,025 B1 * | 4/2010 | Cornell .................. | G01C 23/00 244/75.1 |
| 7,908,042 B2 | 3/2011 | Brinkley et al. | |
| 8,340,654 B2 | 12/2012 | Bratton et al. | |
| 8,560,214 B1 * | 10/2013 | Krenz .................... | G01C 23/00 701/117 |
| 9,141,830 B2 * | 9/2015 | Uczekaj ................. | H04L 67/12 |
| 9,560,185 B2 * | 1/2017 | Nelson ................ | G06F 3/04817 |

(Continued)

FOREIGN PATENT DOCUMENTS

| | | |
|---|---|---|
| CA | 2 831 509 | 1/2014 |
| CN | 103179266 | 6/2013 |

(Continued)

OTHER PUBLICATIONS

European Patent Office, Extended European Search Report, EP 15 24 8001 (dated 2015).

(Continued)

*Primary Examiner* — Ajibola A Akinyemi
(74) *Attorney, Agent, or Firm* — Walters & Wasylyna LLC

(57) ABSTRACT

An aircraft system including an aircraft and an electronic instrument on the aircraft, the electronic instrument including a wireless connectivity interface providing wireless communication over at least one communication channel and a display, wherein the display provides a visual indication of an availability of the communication channel.

22 Claims, 6 Drawing Sheets

(56) References Cited

U.S. PATENT DOCUMENTS

| | | | | |
|---|---|---|---|---|
| 2004/0160340 | A1* | 8/2004 | Thomson | B64D 45/0015 340/945 |
| 2007/0032921 | A1* | 2/2007 | Allen | G01C 23/005 701/3 |
| 2008/0056454 | A1* | 3/2008 | Lahtiranta | H04M 1/642 379/67.1 |
| 2008/0169941 | A1* | 7/2008 | He | G01C 23/00 340/971 |
| 2008/0215193 | A1 | 9/2008 | Hanson | |
| 2010/0152924 | A1* | 6/2010 | Pandit | G01C 23/00 701/3 |
| 2012/0052817 | A1 | 3/2012 | Lee et al. | |
| 2013/0157722 | A1 | 6/2013 | Kim et al. | |
| 2013/0339909 | A1 | 12/2013 | Ha | |
| 2015/0052466 | A1* | 2/2015 | Chun | G06F 3/0486 715/769 |
| 2015/0120097 | A1* | 4/2015 | Hathaway | B64C 19/00 701/14 |

FOREIGN PATENT DOCUMENTS

| | | |
|---|---|---|
| EP | 1 748 394 | 1/2007 |
| JP | 2009-502651 | 1/2009 |
| JP | 2009-502652 | 1/2009 |
| JP | 2013-545654 | 12/2013 |
| WO | WO 2006/086259 | 8/2006 |
| WO | WO 2007/019135 | 2/2007 |

OTHER PUBLICATIONS

Canadian Intellectual Property Office, Examination Report, CA 2,887,812 (dated Mar. 9, 2016)).
ForeFlight, "ForeFlight Mobile 6.1 Introduces Pack, Now Available on the App Store," https://blog.foreflight.com/2014/06/02/foreflight-mobile-6-1-introducing-pack/ (2014).
European Patent Office, "Communication pursuant to Article 49(3) EPC," EP 15 248 001.8 (dated Aug. 19, 2016).
European Patent Office, Communication Pursuant to Article 94(3) EPC, Application No. 15 248 001.8-1875, (dated Jan. 25, 2017).
Canadian Intellectual Property Office, Official Action, CA 2,887,812 (dated Nov. 29, 2017).
Japanese Patent Office, "Notice of Reasons for Rejection," with English translation, App. No. 2015-126231 (dated Jul. 31, 2018).
State Intellectual Property Office of P.R.C., "Notification of First Office Action," with English translation, App. No. 201510400729.2 (dated Jul. 3, 2018).
Canadian Intellectual Property Office, Final Action, App. No. 2,887,812 (dated Nov. 8, 2018).
RocketRoute, "An Introduction to Electronic Flight Bags," https://www.rocketroute.com/blog/electronic-flight-bag (Sep. 6, 2013).
Appleinsider, "FAA approves use of Apple's iPad as electronic flight bag," Blake Steven, http://appleinsider.com/articles/11/07/05/faa_approves_use_of_apples_ipad_as_electronicflight_bag (Jul. 5, 2011).
China National Intellectual Property Administration, "Notification of Second Office Action," with English translation, App No. 201510400729.2 (dated Jan. 24, 2019).

* cited by examiner

VEHICLE SYSTEM AND METHOD FOR INDICATING AVAILABLE COMMUNICATION CHANNELS

FIELD

This application relates to aircraft and, more particularly, to aircraft wireless communication.

BACKGROUND

Pilots of modern-day aircraft, including commercial aircraft and military aircraft, typically rely on various electronic devices, regardless of whether they are on the ground preparing for flight, in flight, or back on the ground after a flight. Many such electronic devices wirelessly transmit and receive data, such as with on-the-ground receivers and transmitters.

As an example, the electronic flight bag has replaced the heavy, paper-filled flight bag pilots typically carried in days past. A typical electronic flight bag is a computing device, such as a portable computer or tablet, that includes a display and wireless communication functionality. Therefore, the typical electronic flight bag is capable of transmitting and receiving data over various channels, such as cellular, wireless local area networks and satellite, and displaying sent and received data to the pilot by way of the display.

The electronic flight bag allows the pilot to perform various tasks, such as executing pre-flight check procedures, generating flight plans, performing take-off and landing calculations, and maintaining flight logs. The electronic flight bag also stores and displays various navigational charts, runway maps, manuals and other documents. Additionally, since the electronic flight bag is configured to wirelessly transmit and receive data, it offers pilots real-time information, such as weather reports, air traffic updates and the like.

Despite advances already made, those skilled in the art continue with research and development efforts in the field of aircraft wireless communication.

SUMMARY

In one embodiment, the disclosed aircraft system may include an aircraft and an electronic instrument on the aircraft. The electronic instrument may include a wireless connectivity interface providing wireless communication over at least one communication channel. The electronic instrument may also include a display, wherein the display provides a visual indication of an availability of the communication channel.

In another embodiment, the disclosed aircraft system may include an aircraft having a flight deck and an electronic instrument on the flight deck. The electronic instrument may include a wireless connectivity interface providing wireless communication over a plurality of communication channels (e.g., a satellite communication channel, a wireless local area network and/or a cellular network). The electronic instrument may also include a display providing a visual indication (e.g., one or more icons), wherein the visual indication is indicative of available communication channels of the plurality of communication channels, and wherein the visual indication is further indicative of in-use communication channels of the plurality of communication channels.

In another embodiment, disclosed is a method for indicating available communication channels on an aircraft. The method may include the steps of (1) providing an electronic instrument having a display, the electronic instrument having wireless connectivity over a plurality of communication channels; (2) ascertaining available communication channels of the plurality of communication channels; (3) ascertaining in-use communication channels of the plurality of communication channels; and (4) visually indicating on the display the available communication channels and the in-use communication channels.

In yet another embodiment, disclosed is a computer-readable storage medium having computer-executable instructions embodied thereon for indicating available communication channels on an aircraft, wherein when executed by an electronic instrument having at least one processor, a display, and wireless connectivity over a plurality of communication channels, the computer-executable instructions cause the electronic instrument to (1) ascertain available communication channels of the plurality of communication channels; (2) ascertain in-use communication channels of the plurality of communication channels; and (3) visually indicate on the display the available communication channels and the in-use communication channels.

Other embodiments of the disclosed aircraft system and method for indicating available communication channels will become apparent from the following detailed description, the accompanying drawings and the appended claims.

DETAILED DESCRIPTION

Figure 1:
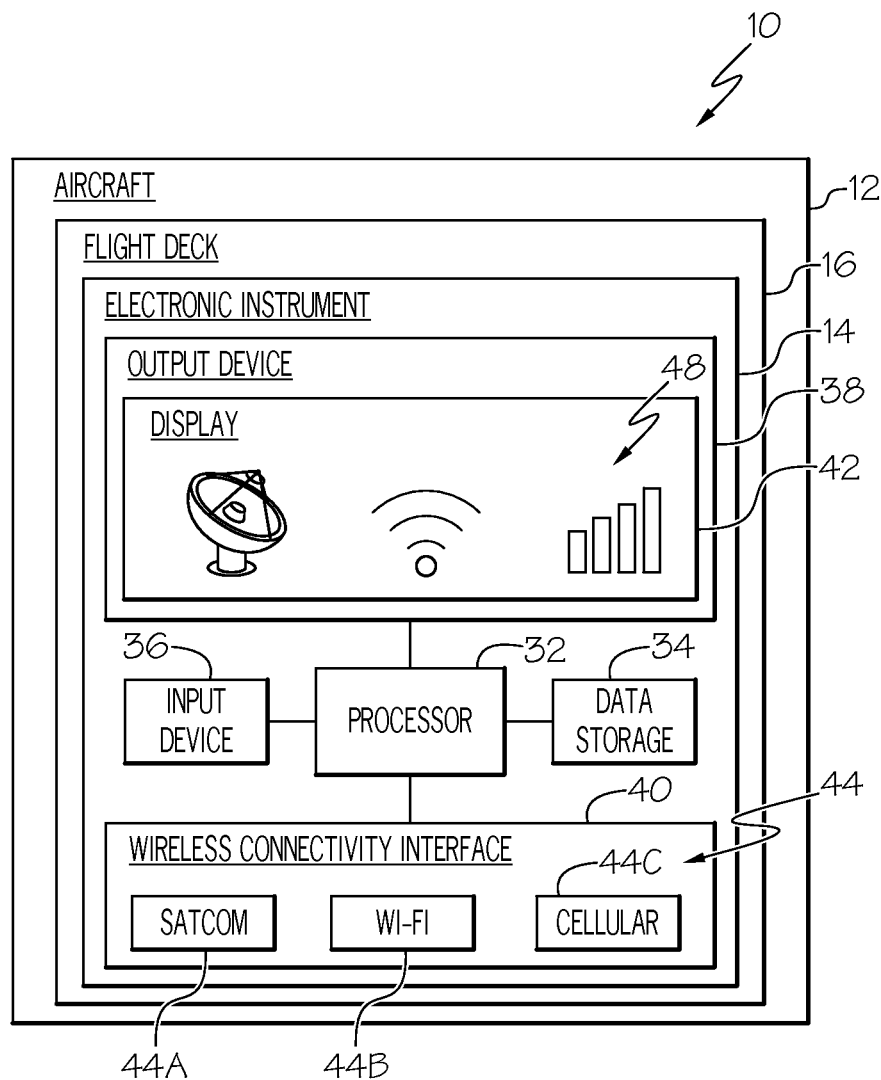
FIG. 1 is a block diagram depicting one embodiment of the disclosed aircraft system for indicating available communication channels.

Referring to FIG. 1, one embodiment of the disclosed aircraft system for indicating available communication channels, generally designated 10, may include an aircraft 12 and an electronic instrument 14. The aircraft 12 may have a flight deck 16 and the electronic instrument 14 may be on the flight deck 16 of the aircraft 12.

Figure 2:
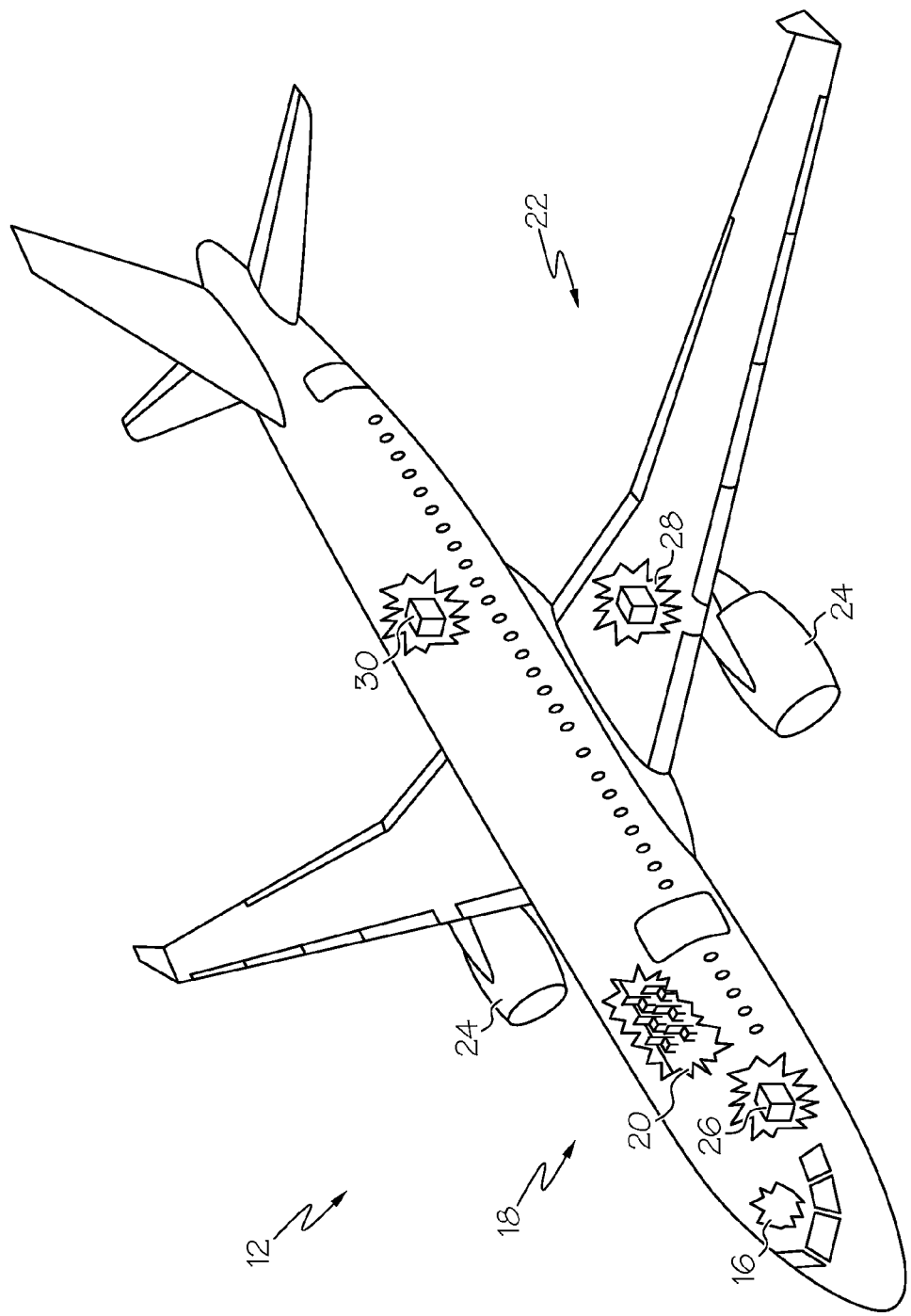
FIG. 2 is a schematic representation, shown in perspective, of the aircraft of the aircraft system of FIG. 1.

As shown in FIG. 2, the aircraft 12 may include an airframe 18 and an interior 20. The airframe 18 of the aircraft 12 may include one or more high-level systems 22, such as a propulsion system 24, an electrical system 26, a hydraulic system 28 and an environmental system 30. The interior 20 of the aircraft 12 may include the flight deck 16 and, optionally, a passenger compartment and/or a cargo hold.

Referring back to FIG. 1, the electronic instrument 14 may include a processor 32, data storage 34, an input device 36, an output device 38 and a wireless connectivity interface 40. The electronic instrument 14 may include fewer features or additional features without departing from the scope of the present disclosure. For example, it is contemplated that, in an alternative to the embodiment shown in FIG. 1, the electronic instrument 14 may be configured without an input device 36.

The processor 32 may be in communication with the data storage 34, the input device 36, the output device 38 and the wireless connectivity interface 40. The processor 32 may include one or more microprocessors and/or multi-core processors, such as a central processing unit. The processor 32 may interpret and execute instructions to effect operation and use of the electronic instrument 14.

The data storage 34 may include volatile and/or non-volatile memory. For example, data storage 34 may include one or more of a random access memory ("RAM"), read only memory ("ROM"), removable disk memory, programmable read-only memory ("PROM"), erasable programmable read-only memory ("EPROM"), electrically erasable programmable read-only memory ("EEPROM"), flash memory, or another type of memory, or a combination of these types of memory. The data storage 34 may store various software packages, such as an operating system and application software, used by the processor 32.

The input device 36 may be any device that permits the pilot of the aircraft 12 to input information to the electronic instrument 14. Examples of suitable input devices 36 include, but are not limited to, a keyboard, a keypad, a mouse, a pen, a microphone, a touchscreen display, and the like.

The output device 38 may be any device that outputs information to the pilot of the aircraft 12. As described in greater detail herein, the output device 38 may provide to the pilot an indication of which (if any) of the communication channels 44 are available. An "available" communication channel 44 may be a communication channel 44 over which data is capable of being transmitted and/or received. Additionally, as described in greater detail herein, the output device 38 may provide to the pilot an indication of which (if any) of the communication channels 44 are in use, such as, for example, when only one available communication channel 44 is permitted to be in use at any given time. An "in-use" communication channel 44 may be a communication channel 44 that is both available and actually being used to transmit and/or receive data.

In one particular realization, the output device 38 may include a display 42, such as a cathode ray tube (CRT) display, a liquid crystal display (LCD), a light emitting diode (LED) display, a plasma display or the like. The display 42 may provide to the pilot a visual indication 48 of which (if any) of the communication channels 44 are available, as well as a visual indication 48 of which (if any) of the communication channels 44 are in use. Alternative output devices 38 include, but are not limited to, speakers, indicator lights, gauges, printing devices and the like.

The wireless connectivity interface 40 may be any feature, such as hardware or a combination of hardware and software, that facilitates wireless communication over one or more communication channels 44. For example, the wireless connectivity interface 40 may facilitate wireless communication between the electronic instrument 14 and various on-the-ground transmitters/receivers (e.g., an airline management; a weather reporting service; air traffic control).

In FIG. 1, the wireless connectivity interface 40 of the electronic instrument 14 is shown with the capability to wirelessly communicate over three communication channels 44, specifically a satellite communication channel 44A, a wireless local area network 44B and a cellular network 44C. However, the wireless connectivity interface 40 may be capable of communicating over fewer than three communication channels 44 or more than three communication channels 44 without departing from the scope of the present disclosure.

Furthermore, while the satellite communication channel 44A, the wireless local area network 44B and the cellular network 44C are shown and described as three examples of communication channels 44, those skilled in the art will appreciate that the wireless connectivity interface 40 of the electronic instrument 14 may facilitate wireless communication over a broad variety of communication channels 44. Other examples of communication channels 44 include, but are not limited to, UHF channels, VHF channels, HF channels, broadband, Gatelink, terminal wireless LAN unit ("TWLU"), aircraft communications addressing and reporting system ("AGARS").

As one general example, the electronic instrument 14 may be an electronic flight bag. As one specific, non-limiting example, the electronic instrument 14 may be a laptop computer-based electronic flight bag. As another specific, non-limiting example, the electronic instrument 14 may be a tablet-based electronic flight bag.

As another general example, the electronic instrument 14 may be an aircraft instrument, such as a flight display. As one specific, non-limiting example, the electronic instrument 14 may be a primary flight display. As another specific, non-limiting example, the electronic instrument 14 may be a secondary flight display.

Figure 3:
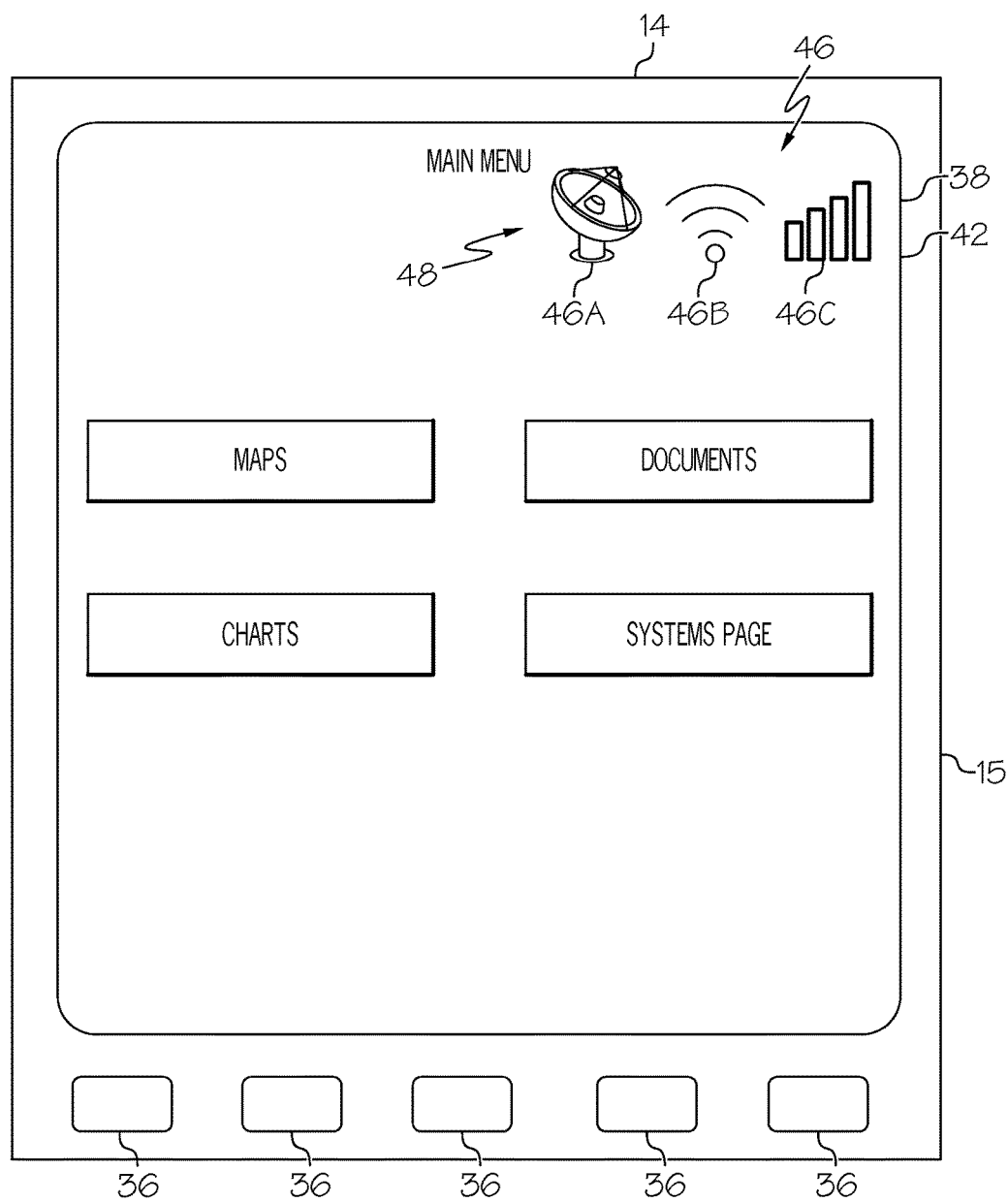
FIG. 3 is a schematic representation of the electronic instrument of the aircraft system of FIG. 1, shown indicating three available communication channels with the cellular communication channel being in use.

Referring now to FIG. 3, in one particular implementation, the electronic instrument 14 of the disclosed aircraft system 10 (FIG. 1) may be an electronic flight bag 15 and may include a display 42 (an output device 38) and one or more input devices 36 (e.g., scroll and selection buttons). To provide to the pilot a visual indication 48 of communication channels 44 (FIG. 1) that are available, icons 46 corresponding to the available communication channels 44 may be displayed on the display 42. For example, the display of icon 46A on the display 42 may provide a visual indication 48 that the satellite communication channel 44A is available, the display of icon 46B on the display 42 may provide a visual indication 48 that the wireless local area network 44B is available, and the display of icon 46C on the display 42 may provide a visual indication 48 that the cellular network 44C is available.

Icons 46 are one example of visual indications 48, specifically graphic visual indications 48, contemplated by the present disclosure. Various other visual indications 48, such as text, illumination (e.g., indicator lights) and other graphical visual indications (e.g., arrows), are also contemplated.

Still referring to FIG. 3, of the available communication channels 44A, 44B, 44C (FIG. 1), as represented by displayed icons 46A, 46B, 46C, only a limited number (e.g., one) may be in use. There may be various reasons for placing in use only one (or several) of the available communication channels 44A, 44B, 44C. For example, communication over each of the available communication channels 44A, 44B, 44C may have a cost associated therewith, and only the communication channel 44 available at the lowest cost may be placed in use. Therefore, while the satellite communication channel 44A, the wireless local area network 44B and the cellular network 44C may be available, as shown by the display of icons 46A, 46B, 46C in FIG. 3, only the cellular network 44C may be in use, as shown by the prominence of icon 46C vis-à-vis the other icons 46A, 46B.

In FIG. 3, icon 46C is made prominent by graying out the other icons 46A, 46B. However, those skilled in the art will appreciate that various techniques may be used to visually identify one icon 46C as being more prominent than the other icons 46A, 46B and, thus, indicative of the communication channel 44C (FIG. 1) that is in use. Prominence may be effected by emphasizing icon 46C and/or deemphasizing icons 46A, 46B. Emphasis and de-emphasis may be added in various ways, such as by bolding one or more icons, graying-out one or more icons, coloring one or more icons (e.g., icon 46C may be green, while icons 46A, 46B may be red), or the like.

Thus, the upper right corner of the display 42 of the electronic instrument 14 shown in FIG. 3 may provide a visual indication 48 to the pilot that three communication channels 44 (FIG. 1) are available, specifically the satellite communication channel 44A (indicated by icon 46A), the wireless local area network 44B (indicated by icon 46B) and the cellular network 44C (indicated by icon 46C), but that only the cellular network 44C is in use (indicated by the prominence of icon 46C relative to deemphasized icons 46A, 46B).

Figure 4:
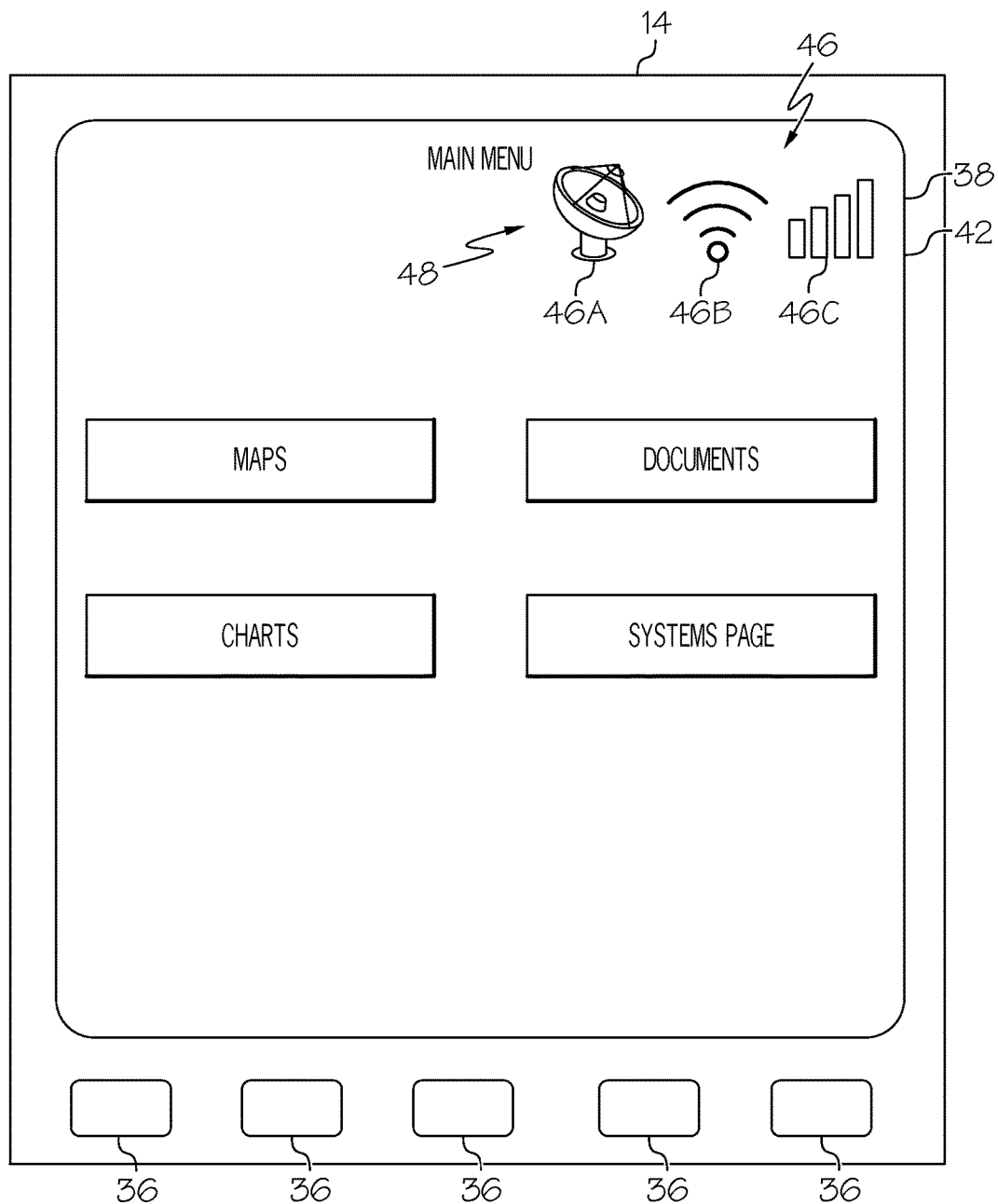
FIG. 4 is a schematic representation of the electronic instrument of the aircraft system of FIG. 1, shown indicating three available communication channels with the wireless local area network communication channel being in use.

Referring to FIG. 4, in one alternative, the upper right corner of the display 42 of the electronic instrument 14 may provide a visual indication 48 to the pilot that three communication channels 44 (FIG. 1) are available, specifically the satellite communication channel 44A (indicated by icon 46A), the wireless local area network 44B (indicated by icon 46B) and the cellular network 44C (indicated by icon 46C), but that only the wireless local area network 44B is in use (indicated by the prominence of icon 46B relative to deemphasized icons 46A, 46C).

Figure 5:
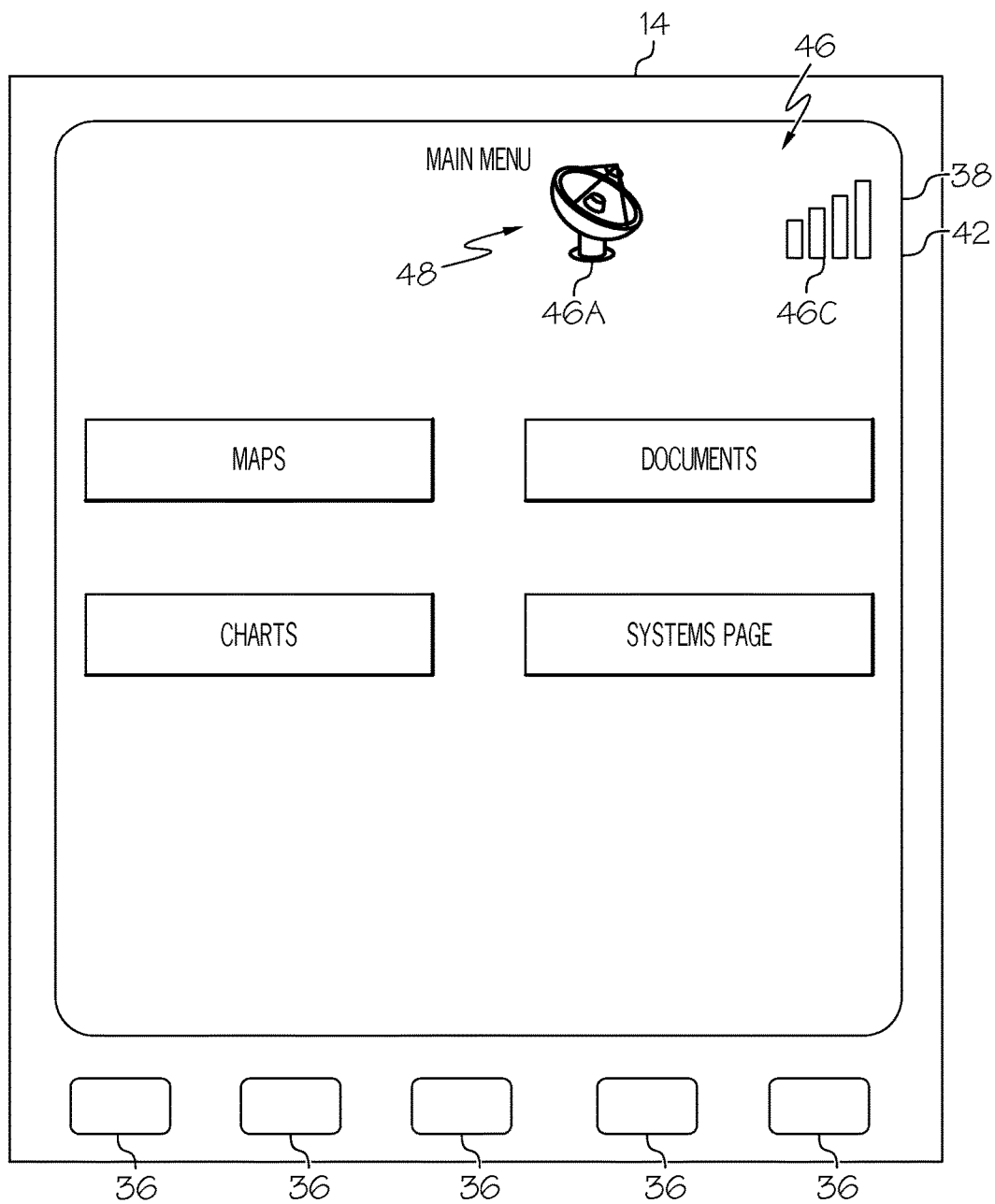
FIG. 5 is a schematic representation of the electronic instrument of the aircraft system of FIG. 1, shown indicating two available communication channels with the satellite communication channel being in use.

Referring to FIG. 5, in another alternative, the upper right corner of the display 42 of the electronic instrument 14 may provide a visual indication 48 to the pilot that two communication channels 44 (FIG. 1) are available, specifically the satellite communication channel 44A (indicated by icon 46A) and the cellular network 44C (indicated by icon 46C), but that only the satellite communication channel 44A is in use (indicated by the prominence of icon 46A relative to deemphasized icon 46C).

As shown in FIGS. 3-5, the visual indication 48 of communication channels 44 (FIG. 1) that are available and in use may appear on the "Main Menu" page. However, the display 42 of the electronic instrument 14 may be capable of displaying various pages, such as a "Maps" page, a "Charts" page, a "Documents" page, and a "Systems Page," in addition to the "Main Menu" page. In one optional variation, such as when distraction is a concern, the visual indication 48 may only be displayed on one or more of the pages accessible by way of the "Main Menu" page, such as only on the "Systems Page"—not on the "Main Menu" page.

Figure 6:
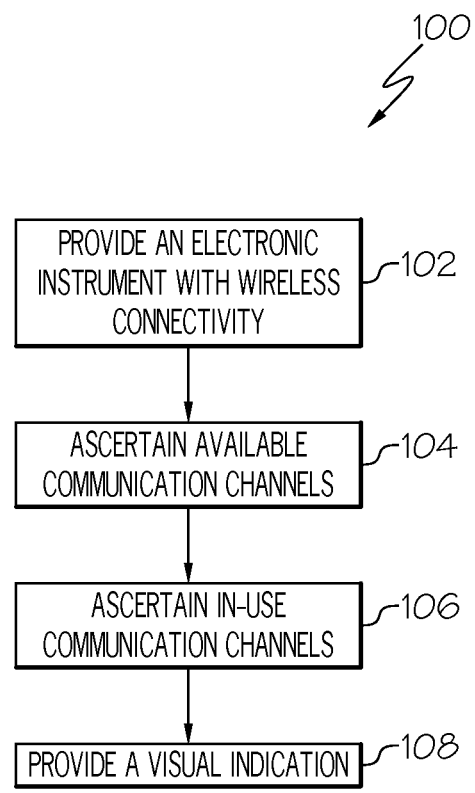
FIG. 6 is a flow chart depicting one embodiment of the disclosed method for indicating available communication channels on an aircraft.

Also disclosed is a method for indicating available communication channels on an aircraft. Referring to FIG. 6, one embodiment of the disclosed method, generally designated 100, may begin at Block 102 with the step of providing an electronic instrument with wireless connectivity over at least one wireless communication channel. The electronic instrument may be an electronic flight bag or the like, and may be on the flight deck of the aircraft.

At Block 104, the communication channels available to the electronic instrument may be ascertained. For example, if the electronic instrument includes a wireless connectivity interface that facilitates wireless communication over three communication channels, at Block 104 the method 100 may ascertain which, if any, of the three communication channels are available.

At Block 106, the in-use communication channel (or channels), if any, of the available communication channels may be ascertained. For example, if two communication channels are available, but only one of the available communication channels is in use (e.g., when only the lower cost communication channel is being used), the method 100 (at Block 106) may ascertain which communication channel is in use.

At Block 108, a visual indication of the available communication channels, if any, and in-use available communication channels, if any, is provided. For example, the step of providing a visual indication (Block 108) may include instructing a display of the electronic instrument to display icons indicative of the available communication channels (if any) and the in-use available communication channels (if any).

Accordingly, the disclosed aircraft system 10 and method 100 may provide aircraft pilots with a quick and readily accessible indication, such as a visual indication (e.g., one or more icons), of the available and in-use communication channels for an electronic instrument, such as an electronic flight bag. Therefore, pilots may use the indication (e.g., visual indication) to prioritize tasks. For example, a pilot may refrain from using the electronic device when no communication channels are available. Additionally, the indication may provide pilots more information in the currency of the data being wirelessly transmitted to the electronic device.

Although various embodiments of the disclosed aircraft system and method for indicating available communication channels have been shown and described, modifications may occur to those skilled in the art upon reading the specification. The present application contemplates and includes such modifications, and is limited only by the scope of the claims.

What is claimed is:

1. A vehicle system comprising:
   a vehicle; and
   an electronic instrument on said vehicle, said electronic instrument comprising:
      a wireless connectivity interface providing wireless communication over at least a first communication channel over which the wireless communication is transmitted from the wireless connectivity interface and a second communication channel over which the wireless communication is transmitted from the wireless connectivity interface; and
      a display comprising a visual indication comprising at least a first icon corresponding to the first communication channel and a second icon corresponding to the second communication channel,
      wherein the first icon has a first state having a first visual appearance being indicative that the first communication channel is not capable of transmitting the wireless communication, a second state having a second visual appearance being indicative that the first communication channel is capable of transmitting the wireless communication but not actually transmitting the wireless communication, and a third state being indicative that the first communication channel is capable of transmitting the wireless communication and actually transmitting the wireless communication, wherein the second visual appearance of the second state is different from the first visual appearance of the first state, and wherein the third visual appearance of the third state is difference from the first visual appearance of the first state and the second visual appearance of the second state, wherein the second icon has a first state having a first visual appearance being indicative that the second communication channel is not capable of transmitting the wireless communication, a second state having a second visual appearance being indicative that the second communication channel is capable of transmitting the wireless communication but not actually transmitting the wireless communication, and a third state being indicative that the second communication channel is capable of transmitting the wireless communication and actually transmitting the wireless communication, wherein the second visual appearance of the second state is different from the first visual appearance of the first state, and wherein the third visual appearance of the third state is difference from the first visual appearance of the first state and the second visual appearance of the second state.

2. The vehicle system of claim 1 wherein said vehicle is an aircraft that comprises a flight deck, and wherein said electronic instrument is on said flight deck.

3. The vehicle system of claim 1 wherein said electronic instrument is an electronic flight bag.

4. The vehicle system of claim 1 wherein said electronic instrument is a flight display.

5. The vehicle system of claim 1 wherein said electronic instrument further comprises a processor and data storage, wherein said processor is in communication with said display, said wireless connectivity interface and said data storage.

6. The vehicle system of claim 1 wherein said electronic instrument further comprises an input device.

7. The vehicle system of claim 1 wherein said plurality of communication channels comprise at least one of a satellite communication channel, a wireless local area network and a cellular network.

8. The vehicle system of claim 1 wherein said plurality of communication channels comprise a satellite communication channel, a wireless local area network and a cellular network.

9. The vehicle system of claim 1 wherein said electronic instrument is a tablet computer.

10. The vehicle system of claim 1 wherein, in said first state, the corresponding icon is removed from said display.

11. The vehicle system of claim 1 wherein, in said second and third states, the corresponding icon is present on said display.

12. The vehicle system of claim 11 wherein said visual appearance is emphasized in said third state relative to said visual appearance in said second state.

13. The vehicle system of claim 1 wherein the first communication channel is a wireless local area network.

14. The vehicle system of claim 13 wherein the second communication channel is a cellular network.

15. The vehicle system of claim 1 wherein the second communication channel is a cellular network.

16. A method for indicating available communication channels on a vehicle, said method comprising the steps of:
providing an electronic instrument comprising a display, said electronic instrument having wireless connectivity over a plurality of communication channels;
ascertaining which communication channels of said plurality of communication channels are available, wherein an available communication channel is capable of transmitting wireless communication;
ascertaining which communication channels of said plurality of communication channels are in-use, wherein an in-use communication channel is actually transmitting wireless communication;
visually indicating on said display which of said communication channels are available and which of said communication channels are unavailable by displaying an icon corresponding to each of said available communication channels and by removing from said display an icon when a communication channel associated therewith becomes unavailable; and
visually indicating on said display which of said available communication channels are in-use and which of said available communication channels are not in-use by emphasizing said icons corresponding to each of said in-use communication channels.

17. The method of claim 16 wherein said plurality of communication channels comprise at least one of a satellite communication channel, a wireless local area network and a cellular network.

18. The method of claim 16 wherein said plurality of communication channels comprise a satellite communication channel, a wireless local area network and a cellular network.

19. The method of claim 16 wherein said electronic instrument is an electronic flight bag.

20. The method of claim 16 wherein said electronic instrument is a tablet computer.

21. A non-transitory computer-readable storage medium having computer-executable instructions embodied thereon for indicating available communication channels on a vehicle, wherein when executed by an electronic instrument having at least one processor, a display, and wireless connectivity over a plurality of communication channels, the computer-executable instructions cause the electronic instrument to:
ascertain which communication channels of said plurality of communication channels are available, wherein an available communication channel is capable of transmitting wireless communication;
ascertain which communication channels of said plurality of communication channels are in-use, wherein an in-use communication channel is actually transmitting wireless communication;
visually indicate on said display which of said communication channels are available and which of said communications channels are unavailable by displaying an icon corresponding to each of said available communication channels and by removing from said display an icon when a communication channel associated therewith becomes unavailable; and
visually indicate on said display which of said available communication channels are in-use and which of said available communication channels are not in-use by emphasizing said icons corresponding to each of said in-use communication channels.

22. The computer-readable storage medium of claim 21 wherein the computer-executable instructions further causes the electronic instrument to remove from said display an icon when a communication channel associated therewith becomes unavailable.

* * * * *